(12) United States Patent
Yu et al.

(10) Patent No.: US 10,943,176 B2
(45) Date of Patent: Mar. 9, 2021

(54) VISUAL ASPECT LOCALIZATION PRESENTATION

(71) Applicant: eBay Inc., San Jose, CA (US)

(72) Inventors: Licheng Yu, Chapel Hill, NC (US); Mohammadhadi Kiapour, San Francisco, CA (US); Ajinkya Gorakhnath Kale, San Jose, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/465,883

(22) Filed: Mar. 22, 2017

(65) Prior Publication Data
US 2018/0276495 A1    Sep. 27, 2018

(51) Int. Cl.
| | | |
|---|---|---|
| G06N 7/00 | (2006.01) | |
| G06N 3/08 | (2006.01) | |
| G06K 9/62 | (2006.01) | |
| G06K 9/46 | (2006.01) | |
| G06N 3/04 | (2006.01) | |
| G06K 9/00 | (2006.01) | |
| G06N 5/02 | (2006.01) | |

(52) U.S. Cl.
CPC ......... *G06N 7/005* (2013.01); *G06K 9/00671* (2013.01); *G06K 9/4628* (2013.01); *G06K 9/6274* (2013.01); *G06N 3/0445* (2013.01); *G06N 3/08* (2013.01); *G06N 5/022* (2013.01)

(58) Field of Classification Search
None
See application file for complete search history.

(56) References Cited

U.S. PATENT DOCUMENTS

| | | |
|---|---|---|
| 9,129,190 B1 | 9/2015 | Ranzato |
| 2008/0005105 A1 | 1/2008 | Lawler et al. |
| 2014/0161360 A1 | 6/2014 | Cao et al. |
| 2014/0180864 A1* | 6/2014 | Orlov ............... G06Q 30/0631 705/26.7 |
| 2015/0379045 A1 | 12/2015 | Zhang et al. |

(Continued)

FOREIGN PATENT DOCUMENTS

WO    2018/175586 A1    9/2018

OTHER PUBLICATIONS

J. Li, X. Mei, D. Prokhorov and D. Tao, "Deep Neural Network for Structural Prediction and Lane Detection in Traffic Scene," in IEEE Transactions on Neural Networks and Learning Systems, vol. 28, No. 3, pp. 690-703, Mar. 2017. doi: 10.1109/TNNLS.2016. 2522428.*

(Continued)

*Primary Examiner* — Jiangeng Sun
(74) *Attorney, Agent, or Firm* — Mintz Levin Cohn Ferris Glovsky and Popeo, P.C.

(57) ABSTRACT

Various embodiments use a neural network to analyze images for aspects that characterize the images, to present locations of those aspects on the images, and, additionally, to permit a user to interact with those locations on the images. For example, a user may interact with a visual cue over one of those locations to modify, refine, or filter the results of a visual search, performed on a publication corpus, that uses an input image (e.g., one captured using a mobile device) as a search query.

19 Claims, 13 Drawing Sheets

(56) References Cited

U.S. PATENT DOCUMENTS

| | | | | |
|---|---|---|---|---|
| 2015/0379959 | A1* | 12/2015 | Dorner | G09G 5/06 |
| | | | | 345/589 |
| 2017/0328732 | A1* | 11/2017 | Vandanapu | G01C 21/3658 |
| 2018/0137417 | A1* | 5/2018 | Theodorakopoulos | ........................ |
| | | | | G06N 3/082 |
| 2018/0137642 | A1* | 5/2018 | Malisiewicz | G06T 7/11 |
| 2018/0181864 | A1* | 6/2018 | Mathew | G06N 3/04 |
| 2018/0190377 | A1* | 7/2018 | Schneemann | G16H 50/20 |

OTHER PUBLICATIONS

Lao, Brian J and Karthik A Jagadeesh. "Convolutional Neural Networks for Fashion Classification and Object Detection." (2015).*
Ross Girshick Jeff Donahue Trevor Darrell Jitendra Malik, "Rich feature hierarchies for accurate object detection and semantic segmentation Tech report (v5)", arXiv:1311.2524v5 [cs.CV] Oct. 22, 2014 (Year: 2014).*
The International Bureau of WIPO, International Preliminary Report on Patentability for PCT Application No. PCT/US2018/023570, dated Oct. 3, 2019, 9 pages.
International Written Opinion for PCT Patent Application No. PCT/US2018/023570, dated Jun. 20, 2018, 7 pages.
International Search Report for PCT Patent Application No. PCT/US2018/023570, dated Jun. 20, 2018, 2 pages.
Abdulnabi, et al., "Multi-task CNN Model for Attribute Prediction", In: IEEE Transactions on 1-20 Multimedia, Jan. 4, 2016, 11 pages.
Karpathy, et al. "Deep Visual-Semantic Alignments for Generating Image Descriptions", Department of Computer Science, Aug. 5, 2016, 10 pages.

* cited by examiner

VISUAL ASPECT LOCALIZATION PRESENTATION

TECHNICAL FIELD

Various embodiments of the present disclosure relate generally to image searching.

BACKGROUND

Traditional searching has been text-based rather than image-based or voice-based. Searching can be overly time-consuming when too many irrelevant results are surfaced, presented to, browsed by, and eventually rejected by a user. As such, some emerging technologies now permit sharing photos of interesting products to help start a search that may be refined by further user input, such as in a multi-turn dialog. Techniques that permit a user to easily refine such image-based searches based on aspects of an object depicted in the image would be beneficial. The present disclosure provides technical solutions in that regard.

BRIEF DESCRIPTION OF THE DRAWINGS

Various ones of the appended drawings merely illustrate various embodiments of the present disclosure and cannot be considered as limiting its scope.

Figure 1:
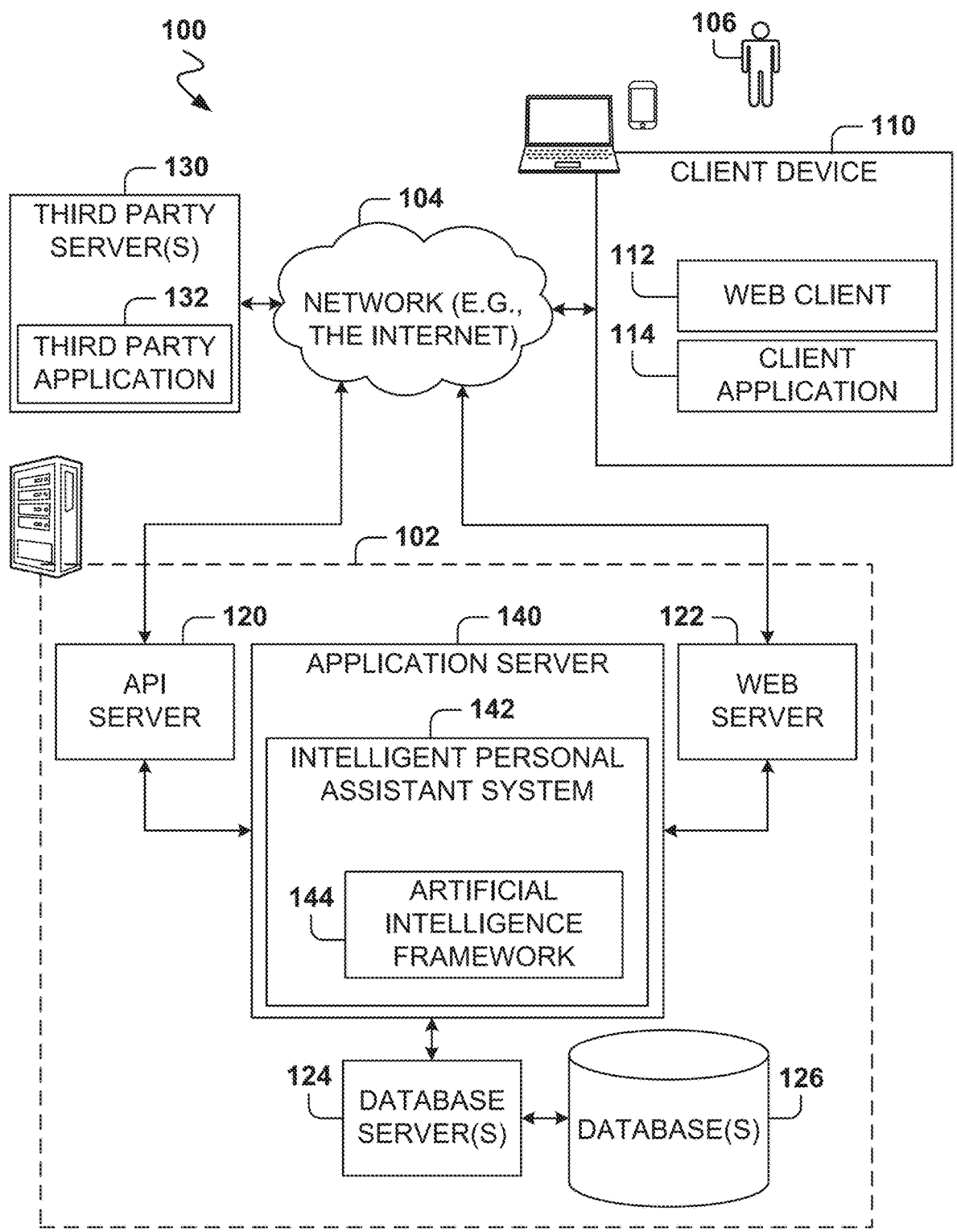
FIG. 1 is a block diagram illustrating an example networked system, according to some embodiments.

The headings provided herein are merely for convenience and do not necessarily affect the scope or meaning of the terms used.

DETAILED DESCRIPTION

The description that follows describes systems, methods, techniques, instruction sequences, and computing machine program products that illustrate embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

As used herein, categories describe predetermined object groupings or sub-groupings in a publication corpus. Categories may be branched, so that a particularly narrow subcategory may be regarded as a leaf category that may best narrow a given publication search to a small set of items best meeting a specified set of search constraints. Where the publication corpus relates to an electronic marketplace, the categories may describe predetermined product groupings or sub-groupings provided by the electronic marketplace (e.g., "wine", "shoes", "paint"), or may be open-ended for seller definition. In an electronic marketplace, an example leaf category could include "men's athletic shoes".

As also used herein, an aspect (also called an attribute) is a descriptive parameter that characterizes an object (e.g., one depicted within an image). An aspect can comprise an aspect value that specifies the aspect's descriptive parameter for a particular object. An aspect can be shareable across a category of objects. For some embodiments, an aspect comprises a visual aspect (e.g., mid-level visual concept), which may be shareable across item categories (e.g., aspect of color for clothing category or shoe category items) or may be specific to a specific item category (e.g., aspect of number of handles for a faucet category item). Exemplary aspects or attributes may include, but are not limited to, "brand", "color", "style", "material", and "size". Corresponding exemplary values may include "Nike", "red", "running", "canvas", and "ten", for example.

Various embodiments use a neural network (e.g., end-to-end deep network) to predict the presence of visual aspects in an input image depicting an object, localize those visual aspects of the object, and mark them on the input image for presentation to a user. In particular, for some embodiments, an input image is analyzed using a trained neural network to localize and predict a set of aspect values of an object depicted in the input image. A set of visual cues may be presented over the input image such that the visual cues correspond to locations on the input image that are associated with the predicted aspect values for the depicted object. A set of locations, associated with a given predicted aspect value, can be regarded as salient regions of the input image that drive (e.g., cause) the prediction of the aspect value. Some locations may be more relevant than others, and that level of relevance may also be reflected in connection with the visual cues (e.g., heat map-based visual cues that show more salient locations to be hotter). Through the visual cues, various embodiments can mark and visually present a user with aspect localizations over the input image.

As described herein, presenting the aspect localizations can be useful in helping a user understand what is driving the prediction of certain aspect values (e.g., reasons behind certain predictions). For instance, based on the aspect localizations presented, a user may determine why inaccurate aspect values are being predicted for an input image depicting an object (e.g., a shoe). Based on the presented aspect localizations, the user may determine for instance that due to bad lighting or a bad camera angle of the input image, the depicted object is predicted to have a color aspect of light grey rather than white. The user may address such an issue by adjusting the lighting or camera and recapturing an input image of the object.

As also described herein, presenting the aspect localizations can enable a user to interact with the input image when refining a visual search based on the input image. For instance, a visual search of an item may involve submitting an input image through a trained neural network, and receiving as results a set of items (e.g., from a publication corpus) that best match an object depicted in the input image. As part of the results, the trained neural network may provide a category prediction for the object depicted in the input image, a set of predicted aspect values for the object, a set of probabilities (probability values) for the set of predicted aspect values, or a set of locations on the input image associated with the set of predicted aspect values. After a visual search is performed, the user can interact with a visual cue presented over the input image to refine the visual search based on the aspect value associated with that visual cue. For instance, a user may select a visual cue corresponding to a particular aspect (e.g., heel size) of an object (e.g., shoe) depicted in the input image. Though the shoe in the input image depicts a particular aspect value (e.g., high heel) for the aspect (e.g., heel size), the user selection of the visual cue may present the user with a set of images of other same-category objects (e.g., other shoes) that represent different possible aspect values (e.g., no heel, short heel, mid heel, etc.) for the aspect (e.g., heel size). The user may select from one of those images to refine their visual search (e.g., user selects image depicting a shoe having no heel). In this way, a user can use visual cues to refine a visual search "locally" (e.g., based on focusing on a certain region of the input image) instead of just globally (e.g., matching the entire input image). The user can interact with visual cues to guide the attention of an artificial intelligence (e.g., intelligent personal assistant as described herein) to the user's exact needs. In this way, the need for a user to refine visual searches in terms of words or text filters can be reduced.

FIG. 1 is a block diagram illustrating an example networked system, according to some embodiments. With reference to FIG. 1, an embodiment of a high-level client-server-based network architecture 100 is shown. A networked system 102 in the example can form a network-based marketplace or payment system, and provides server-side functionality via a network 104 (e.g., the Internet or a wide area network (WAN)) to one or more client devices 110. FIG. 1 illustrates, for example, a web client 112 (e.g., a browser, such as the Internet Explorer® browser developed by Microsoft® Corporation of Redmond, Wash. State) and a client application 114 executing on the client device 110.

The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may utilize to access the networked system 102. In some embodiments, the client device 110 comprises a display module (not shown) to display information (e.g., in the form of user interfaces). In further embodiments, the client device 110 comprises one or more touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for marketplace transactions. One or more users 106 may be a person, a machine, or other means of interacting with the client device 110. In embodiments, the user 106 is not part of the network architecture 100, but interacts with the network architecture 100 via the client device 110 or another means. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi® network, a WiMax network, another type of network, or a combination of two or more such networks.

The client device 110 may include one or more applications (also referred to as "apps") such as, but not limited to, a web browser, messaging application, electronic mail (email) application, e-commerce site application (also referred to as a marketplace application), and the like. In some embodiments, the e-commerce site application is included in one of the client devices 110, and the application is configured to locally provide the user interface and at least some of the functionalities to communicate with the networked system 102, on an as-needed basis, for data or processing capabilities not locally available (e.g., to access a database of items available for sale, to authenticate a user, to verify a method of payment, etc.). Conversely, in some embodiments, the e-commerce site application is not included in the client device 110, and the client device 110 may use its web browser to access the e-commerce site (or a variant thereof) hosted on the networked system 102.

One or more users 106 may be a person, a machine, or other means of interacting with the client device 110. In embodiments, the user 106 is not part of the network architecture 100, but may interact with the network architecture 100 via the client device 110 or other means. For instance, the user 106 provides input (e.g., touch-screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application programming interface (API) server 120 and a web server 122 are coupled to, and provide programmatic and web interfaces respectively to, one or more application servers 140. The application server 140 hosts an intelligent personal assistant system 142, which includes an artificial intelligence framework (AIF) 144, each of which may comprise one or more modules or applications and each of which may be embodied as hardware, software, firmware, or any combination thereof.

The application server 140 is shown to be coupled to one or more database servers 124 that facilitate access to one or more information storage repositories or databases 126. In an embodiment, the databases 126 are storage devices that store information (e.g., publications or listings) to be posted to the application server 140, which may implement a publication system (not shown). The databases 126 may also store digital item information, in accordance with some embodiments.

Additionally, a third-party application 132, executing on third-party servers 130, is shown as having access to the networked system 102 via the programmatic interface provided by the API server 120. For example, the third-party application 132, utilizing information retrieved from the networked system 102, supports one or more features or functions on a website hosted by a third party. The third-party website, for example, may provide one or more promotional, marketplace, or payment functions that are supported by the relevant applications of the networked system 102.

Further, while the client-server-based network architecture 100 shown in FIG. 1 employs a client-server architecture, various embodiments are not limited to such an architecture, and could find application in a distributed, or peer-to-peer, architecture system, for example. The intelligent personal assistant system 142 and the AIF 144 could also be implemented as separate standalone software programs, which do not necessarily have networking capabilities.

The web client 112 may access the intelligent personal assistant system 142 via the web interface supported by the web server 122. Similarly, the client application 114 accesses the various services and functions provided by the intelligent personal assistant system 142 via the programmatic interface provided by the API server 120.

Figure 2:
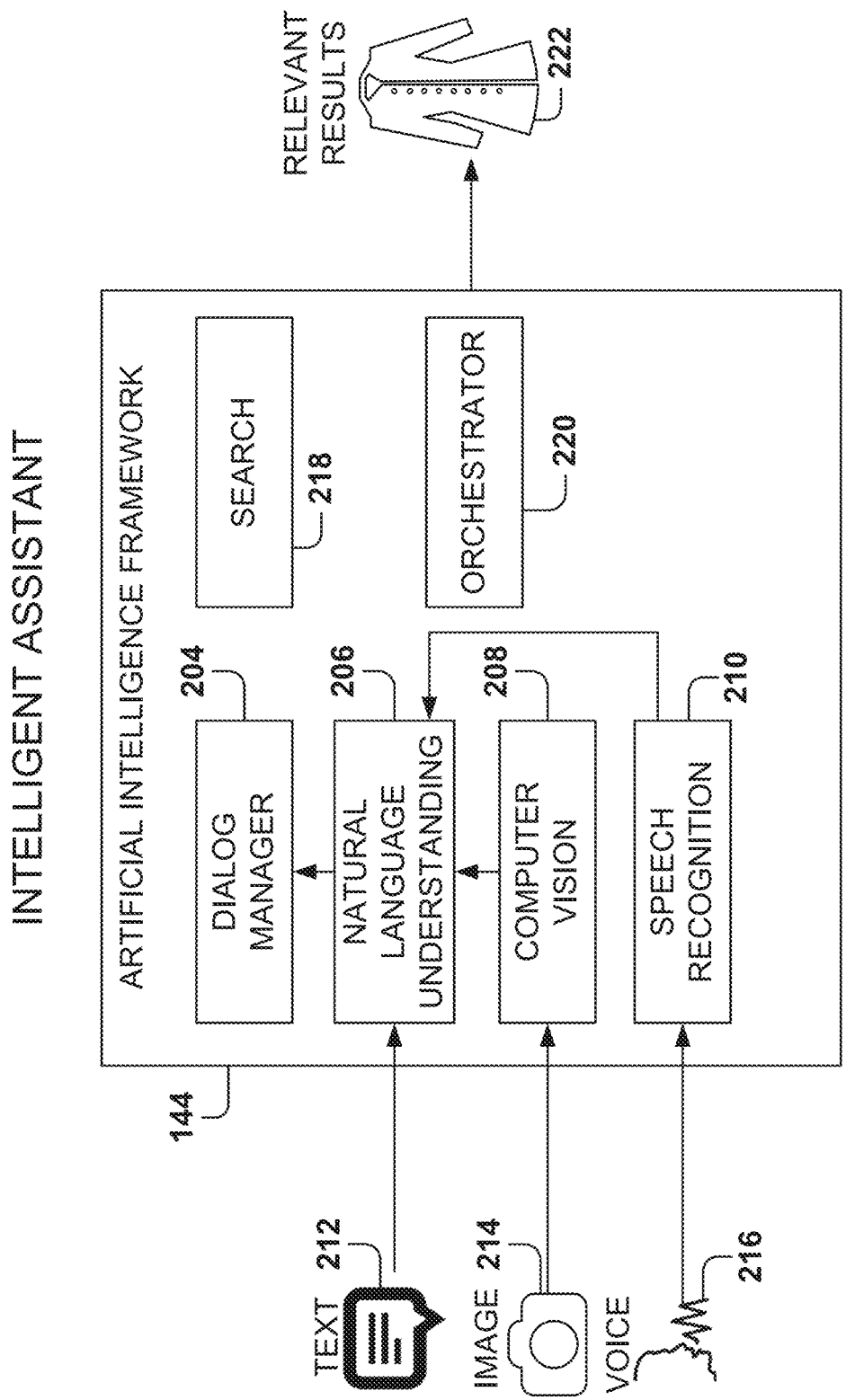
FIG. 2 is a diagram illustrating the operation of an example intelligent assistant, according to some embodiments.

FIG. 2 is a diagram illustrating the operation of an example intelligent assistant, such as the intelligent personal assistant system 142 of FIG. 1, according to some embodiments. Today's online shopping can be impersonal, unidirectional, and not conversational. Buyers cannot speak in plain language to convey their wishes, making it difficult to convey intent. Shopping on an online commerce site can be more difficult than speaking with a salesperson or a friend about a product, so oftentimes buyers have trouble finding the products they want.

Various embodiments utilize a personal shopping assistant, also referred to as an intelligent assistant, that supports two-way communication with the shopper to build context and understand the intent of the shopper, enabling delivery of better, personalized shopping results. The intelligent assistant has natural, human-like dialog that can help a buyer in an intuitive, easy-to-use manner, thus increasing the likelihood that the buyer will reuse the intelligent assistant for future purchases.

As shown, one example intelligent assistant includes the AIF 144. According to various embodiments, the AIF 144 understands the user and the available inventory to respond to natural-language queries, and has the ability to deliver incremental improvements in anticipating and understanding the user and his or her needs.

As shown, the AIF 144 includes a dialog manager 204, natural-language understanding (NLU) component 206, computer vision component 208, speech recognition component 210, search component 218, and orchestrator 220. The AIF 144 is able to receive different kinds of inputs, such as text input 212, image input 214, and voice input 216, to generate relevant results 222. As used herein, the AIF 144 can include a plurality of services (e.g., NLU component 206 and computer vision component 208) that are implemented by corresponding servers, and the terms "service" or "server" may be utilized to identify the service and the corresponding server.

The NLU component 206 processes natural-language text input 212, comprising both formal and informal language; detects the intent of the text input 212; and extracts useful information, such as objects of interest and their attributes. The natural-language user input can be transformed into a structured query using rich information from additional knowledge to enrich the query even further. This information is then passed on to the dialog manager 204 through the orchestrator 220 for further actions with the user or with the other components in the overall system. The structured and enriched query may also be consumed by the search component 218 for improved matching. The text input 212 may be a query for a product, a refinement to a previous query, or other information about an object of relevance (e.g., shoe size).

The computer vision component 208 takes image input 214 and performs image recognition to identify the characteristics of the image (e.g., item the user wants to ship), which are then transferred to the NLU component 206 for processing. The speech recognition component 210 takes voice input 216 and performs language recognition to convert speech to text, which is then transferred to the NLU component 206 for processing.

The NLU component 206 determines the object, the aspects associated with the object, how to create the search interface input, and how to generate the response. For example, the AIF 144 may ask questions to the user to clarify what the user is looking for. This means that the AIF 144 not only generates results 222, but also may create a series of interactive operations to get to the optimal, or close to optimal, results 222.

For instance, in response to the query, "Can you find me a pair of red nike shoes?" the AIF 144 may generate the following parameters: <intent:shopping, statement-type: question, dominant-object: shoes, target:self, color:red, brand:nike>. To the query "I am looking for a pair of sunglasses for my wife", the AIF 144 may generate <intent: shopping, statement-type:statement, dominant-object:sunglasses, target:wife, target-gender:female>.

The dialog manager 204 is the module that analyzes the query of a user to extract meaning, and determines if there is a question that needs to be asked in order to refine the query, before sending the query to the search component 218. The dialog manager 204 uses the current communication in the context of the previous communications between the user and the AIF 144. The questions are automatically generated dependent on the combination of the accumulated knowledge (e.g., provided by a knowledge graph) and what the search component 218 can extract out of the inventory. The dialog manager 204's job is to create a response for the user. For example, if the user says, "hello", the dialog manager 204 generates a response "Hi, my name is bot".

The orchestrator 220 coordinates the interactions among the other services within the AIF 144. More details are provided below about the interactions of the orchestrator 220 with other services with reference to FIG. 5.

Figure 3:
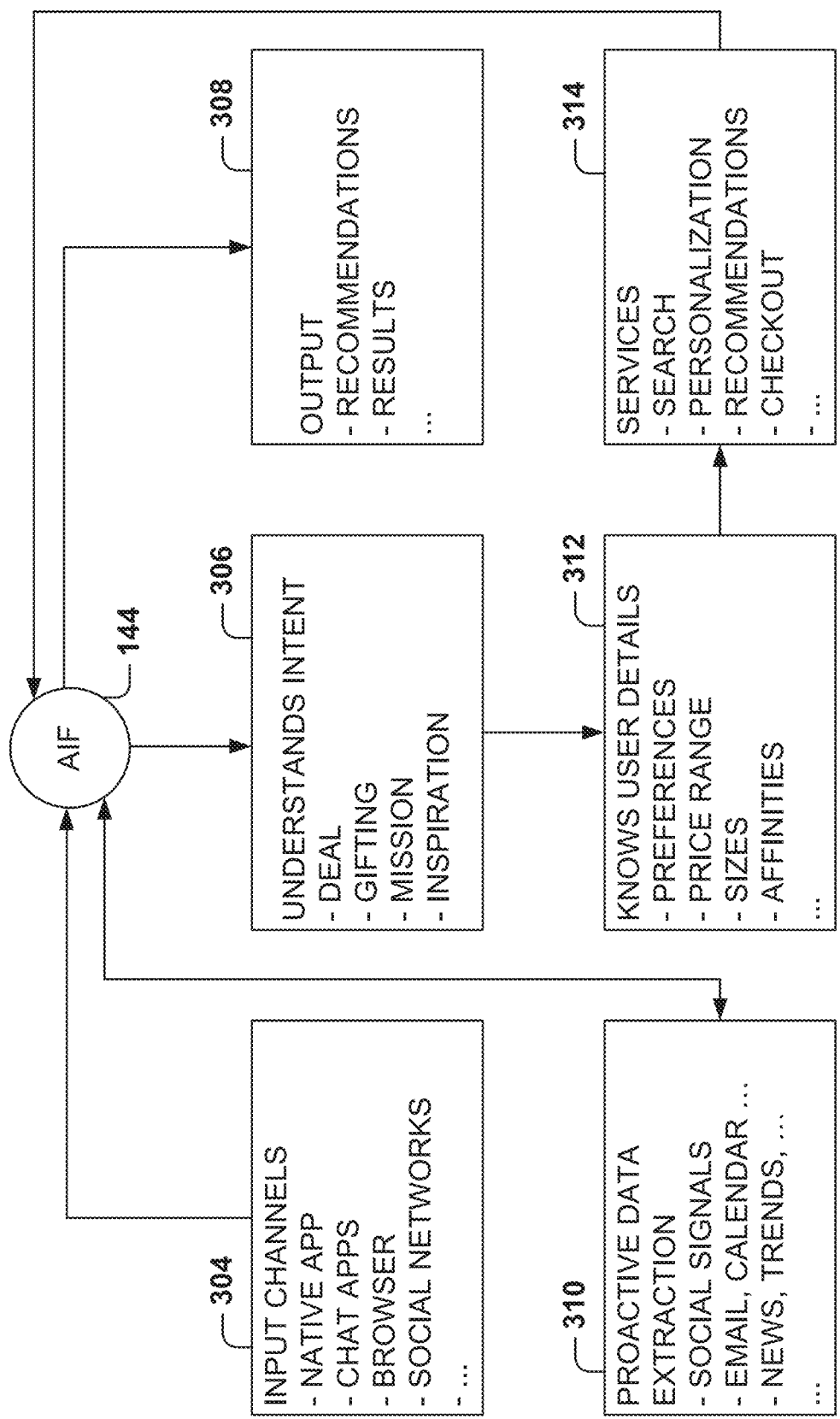
FIG. 3 illustrates the features of an example artificial intelligence (AI) framework, according to some embodiments.

FIG. 3 illustrates the features of the AIF 144, according to some embodiments. As shown, the AIF 144 is able to interact with several input channels 304, such as native commerce applications, chat applications, social networks, browsers, and the like. In addition, the AIF 144 understands the intent 306 expressed by the user, where the intent 306 may include, for example, a user looking for a good deal, a user looking for a gift, a user on a mission to buy a specific product, a user looking for suggestions, and the like.

As also shown, the AIF 144 performs proactive data extraction 310 from multiple sources, such as social networks, email, calendars, news, market trends, and the like. The AIF 144 knows about user details 312, such as user preferences, desired price ranges, sizes, affinities, and the like. The AIF 144 facilitates a plurality of services 314 within a service network, such as product search, personalization, recommendations, checkout features, and the like. Output 308 may include recommendations, results, and the like.

According to various embodiments, the AIF 144 is an intelligent and friendly system that understands the user's intent (e.g., targeted search, compare, shop, browse), mandatory parameters (e.g., product, product category, item), optional parameters (e.g., aspects of the item, color, size, occasion), and implicit information (e.g., geolocation, personal preferences, age, gender). Based on such understandings, the AIF 144 responds with a well-designed response in plain language.

For instance, the AIF 144 may process input queries, such as: "Hey! Can you help me find a pair of light pink shoes for my girlfriend please? With heels. Up to $200. Thanks"; "I recently searched for a men's leather jacket with a classic James Dean look. Think almost Harrison Ford's in the new Star Wars movie. However, I'm looking for quality in a price range of $200-300. Might not be possible, but I wanted to see!"; or "I'm looking for a black Northface Thermoball jacket".

In various embodiments, the AIF 144 provides a configurable, flexible interface with machine-learning capabilities for ongoing improvement. In this way, the AIF 144 can support a commerce system that provides value (connecting the user to the things that the user wants), intelligence (knowing and learning from the user and the user's behavior to recommend the right items), convenience (offering a plurality of user interfaces), ease of use, and efficiency (saves the user time and money).

Figure 4:
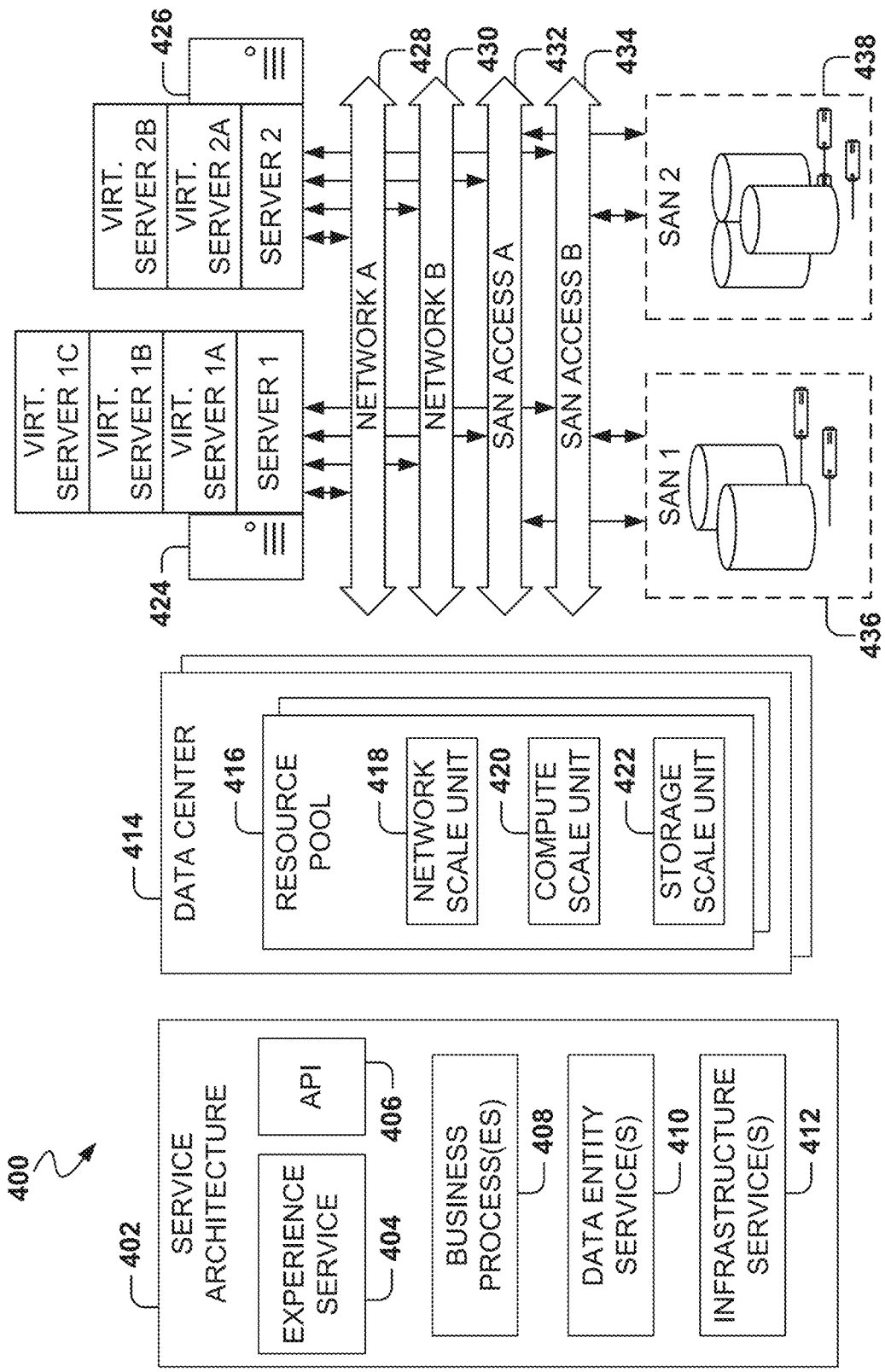
FIG. 4 is a diagram illustrating an example service architecture, according to some embodiments.

FIG. 4 is a diagram illustrating an example service architecture 400, according to some embodiments. As illustrated, FIG. 4 presents various views of the service architecture 400 in order to describe how the service architecture 400 may be deployed on various data centers or cloud services. The service architecture 400 represents a suitable environment for implementation of the embodiments described herein.

A service architecture 402 represents how a cloud architecture typically appears to a user, developer, and so forth. The architecture is generally an abstracted representation of the actual underlying architecture implementation, represented in the other views of FIG. 1. For example, the service architecture 402 can comprise a plurality of layers that represent different functionality and/or services associated with the service architecture 402.

An experience service layer 404 represents a logical grouping of services and features from the end customer's point of view, built across different client platforms, such as applications running on a platform (mobile phone, desktop, etc.), web-based presentation (mobile web, desktop web browser, etc.), and so forth. The experience service layer 404 includes rendering user interfaces and providing information to the client platform so that appropriate user interfaces can be rendered, capturing client input, and so forth. In the context of a marketplace, examples of services that would reside in this layer are a home page (e.g., home view), a view item listing, a search or view search results service, a shopping cart, a buying user interface and related services, a selling user interface and related services, after-sale experiences (posting a transaction, feedback, etc.), and so forth. In the context of other systems, the experience service layer 404 would incorporate those end-user services and experiences that are embodied by the system.

An API layer 406 contains APIs which allow interaction with business process and core layers. This allows third-party development against the service architecture 402 and allows third parties to develop additional services on top of the service architecture 402.

A business process service layer 408 is where the business logic resides for the services provided. In the context of a marketplace, this is where services such as user registration, user sign-in, listing creation and publication, add to shopping cart, place an offer, checkout, send invoice, print labels, ship item, return item, and so forth would be implemented. The business process service layer 408 may also coordinate between or among various business logic and data entities and as such could represent a composition of shared services. The business processes in the business process service layer 408 can also support multi-tenancy in order to increase compatibility with some cloud service architectures.

A data entity service layer 410 enforces isolation around direct data access and contains the services upon which higher-level layers depend. Thus, in the marketplace context, this layer can comprise underlying services such as order management, financial institution management, user account services, and so forth. The services in this layer typically support multi-tenancy.

An infrastructure service layer 412 comprises those services that are not specific to the type of service architecture being implemented. Thus, in the context of a marketplace, the services in this layer may be services that are not specific or unique to a marketplace. Accordingly, functions such as cryptographic functions, key management, CAPTCHA, authentication and authorization, configuration management, logging, tracking, documentation and management, and so forth can reside in this layer.

Some embodiments of the present disclosure are implemented in one or more of these layers. In particular, the AIF 144, as well as the orchestrator 220 and the other services of the AIF 144, may be implemented by a plurality of layers.

A data center 414 is a representation of various resource pools 416 along with their constituent scale units. This data center 414 representation illustrates the scaling and elasticity that come with implementing the service architecture 402 in a cloud-computing model. The resource pool 416 comprises server (or compute) scale units 420, network scale units 418, and storage scale units 422. A scale unit is a server, network, and/or storage unit that is the smallest unit capable of deployment within the data center 414. The scale units allow for more capacity to be deployed or removed as the need increases or decreases.

The network scale unit 418 contains one or more networks (such as network interface units, etc.) that can be deployed. The networks can include, for example, virtual LANs. The compute scale unit 420 typically comprises a unit (server, etc.) that contains a plurality of processing units, such as processors. The storage scale unit 422 contains one or more storage devices such as disks, storage attached networks (SANs), network attached storage (NAS) devices, and so forth. These are collectively illustrated as SANs in the description below. Each SAN may comprise one or more volumes, disks, and so forth.

The remaining view of FIG. 4 illustrates another example of a service architecture 400. This view is more hardwarefocused and illustrates the resources underlying the more logical architecture in the other views of FIG. 4. A cloud-computing architecture typically has a plurality of servers or other systems 424, 426. These servers 424, 426 comprise a plurality of real and/or virtual servers. Thus the server 424 comprises the server 1 along with virtual servers IA, 1B, 1C and so forth.

The servers 424, 426 are connected to and/or interconnected by one or more networks such as network A 428 and/or network B 430. The servers 424, 426 are also connected to a plurality of storage devices, such as SAN 1 (436), SAN 2 (438), and so forth. The SANs 436, 438 are typically connected to the servers 424, 426 through a network such as SAN access A 432 and/or SAN access B 434.

The compute scale units 420 are typically some aspect of the servers 424 and/or 426, such as processors and other hardware associated therewith. The network scale units 418 typically include, or at least utilize, the illustrated networks A (428) and B (432). The storage scale units 422 typically include some aspect of SAN 1 (436) and/or SAN 2 (438). Thus, the logical service architecture 402 can be mapped to the physical architecture.

Services and other implementation of the embodiments described herein will run on the servers or virtual servers (e.g., on 424 or 426) and utilize the various hardware resources to implement the disclosed embodiments.

Figure 5:
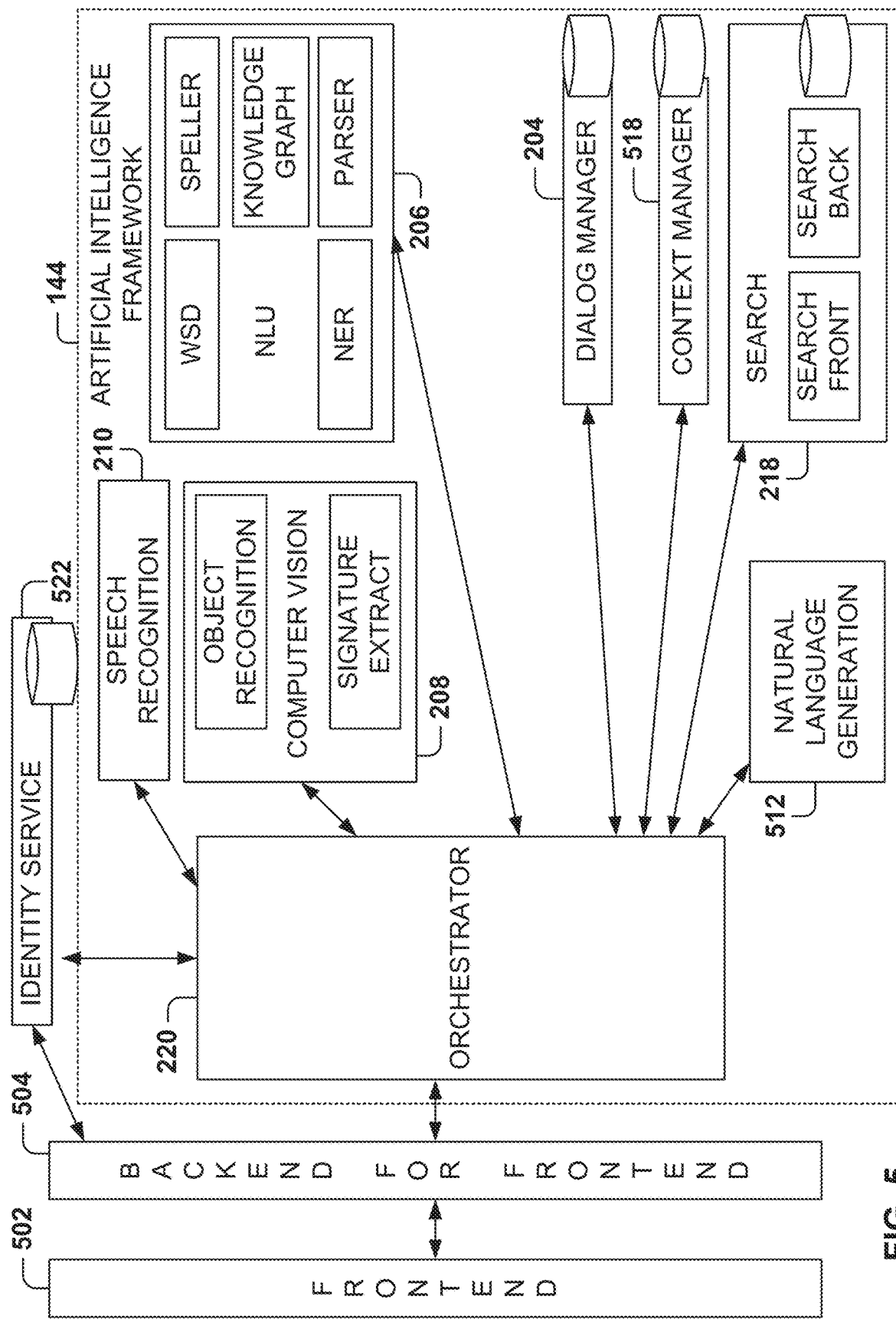
FIG. 5 is a block diagram for implementing the AI framework, according to some embodiments.

FIG. 5 is a block diagram for implementing the AIF 144, according to some embodiments. Specifically, the intelligent personal assistant system 142 of FIG. 1 is shown to include a front-end component 502 (FE) by which the intelligent personal assistant system 142 communicates (e.g., over the network 104) with other systems within the network architecture 100. The front-end component 502 can communicate with the fabric of existing messaging systems. As used herein, the term "messaging fabric" refers to a collection of APIs and services that can power third-party platforms such as Facebook® messenger, Microsoft® Cortana, and others "bots". In one example, a messaging fabric can support an online commerce ecosystem that allows users to interact with commercial intent. Output of the front-end component 502 can be rendered in a display of a client device, such as the client device 110 in FIG. 1, as part of an interface with the intelligent personal assistant system 142.

The front-end component 502 of the intelligent personal assistant system 142 is coupled to a back-end component 504 for the front end (BFF) that operates to link the front-end component 502 with the AIF 144. The AIF 144 can include several components discussed below.

In one embodiment, the orchestrator 220 orchestrates communication of components inside and outside the AIF 144. Input modalities for the orchestrator 220 are derived from the computer vision component 208, the speech recognition component 210, and a text normalization component which may form part of the speech recognition component 210. The computer vision component 208 may identify objects and attributes from visual input (e.g., a photo). The speech recognition component 210 converts audio signals (e.g., spoken utterances) into text. The text normalization component operates to perform input normalization, such as language normalization by rendering emoticons into text, for example. Other normalization is possible, such as orthographic normalization, foreign-language normalization, conversational text normalization, and so forth.

The AIF 144 further includes the NLU component 206 that operates to parse and extract user intent and intent parameters (for example, mandatory or optional parameters). The NLU component 206 is shown to include sub-components such as a spelling corrector (speller), a parser, a named-entity recognition (NER) sub-component, a knowledge graph, and a word sense detector (WSD).

The AIF 144 further includes the dialog manager 204 that operates to understand a "completeness of specificity" (for example, of an input, such as a search query or utterance) and decide on a next action type and a parameter (e.g., "search" or "request further information from user"). In one example, the dialog manager 204 operates in association with a context manager 518 and a natural language generation (NLG) component 512. The context manager 518 manages the context and communication of a user with respect to an online personal assistant (or "bot") and the assistant's associated artificial intelligence. The context manager 518 comprises two parts: long-term history and short-term memory. Data entries into one or both of these parts can include the relevant intent and all parameters and all related results of a given input, bot interaction, or turn of communication, for example. The NLG component 512 operates to compose a natural-language utterance out of an AI message to present to a user interacting with the intelligent bot.

The search component 218 is also included within the AIF 144. As shown, the search component 218 has a front-end and a back-end unit. The back-end unit operates to manage item and product inventory and provide functions of searching against the inventory and optimizing towards a specific tuple of intent and intent parameters. An identity service 522 component, which may or may not form part of the AIF 144, operates to manage user profiles, for example explicit information in the form of user attributes (e.g., "name", "age", "gender", "geolocation"), but also implicit information in forms such as "information distillates" such as "user interest", "similar persona", and so forth. The identity service 522 includes a set of policies, APIs, and services that elegantly centralizes all user information, enabling the AIF 144 to have insights into the users' wishes. Further, the identity service 522 protects the commerce system and its users from fraud or malicious use of private information.

The functionalities of the AIF 144 can be divided into multiple parts, for example decision-making and context parts. In one example, the decision-making part includes operations by the orchestrator 220, the NLU component 206 and its subcomponents, the dialog manager 204, the NLG component 512, the computer vision component 208, and the speech recognition component 210. The context part of the AI functionality relates to the parameters (implicit and explicit) around a user and the communicated intent (for example, towards a given inventory, or otherwise). In order to measure and improve AI quality over time, in some embodiments, the AIF 144 is trained using sample queries (e.g., a development set of image-based queries) and tested on a different set of queries (e.g., an evaluation set of image-based queries), both sets to be developed by human curation or from use data. Also, the AIF 144 is to be trained on transaction and interaction flows defined by experienced curation specialists, or human override. The flows and the logic encoded within the various components of the AIF 144 define what follow-up utterance or presentation (e.g., question, result set) is made by the intelligent personal assistant system 142 based on an identified user intent.

The intelligent personal assistant system 142 seeks to understand a user's intent (e.g., targeted search, compare, shop, browse, and so forth), mandatory parameters (e.g., product, product category, item, and so forth), and optional parameters (e.g., explicit information, e.g., aspects of item/product, occasion, and so forth), as well as implicit information (e.g., geolocation, personal preferences, age and gender, and so forth) and respond to the user with a content-rich and intelligent response. Explicit input modalities can include text, speech, and visual input, and can be enriched with implicit knowledge of the user (e.g., geolocation, gender, birthplace, previous browse history, and so forth). Output modalities can include text (such as speech, natural-language sentences, and product-relevant information) and images on the screen of a smart device (e.g., client device 110). Input modalities thus refer to the different ways users can communicate with the bot. Input modalities can also include keyboard or mouse navigation, touch-sensitive gestures, and so forth.

In relation to a modality for the computer vision component 208, a photograph can often represent what a user is looking for better than text. Also, the computer vision component 208 may be used to form shipping parameters based on the image of the item to be shipped. The user may not know what an item is called, or it may be hard or even impossible to use text for finely detailed information that an expert may know, for example a complicated pattern in apparel or a certain style in furniture. Moreover, it is inconvenient to type complex text queries on mobile phones, and long text queries typically have poor recall. Key functionalities of the computer vision component 208 include object localization, object recognition, optical character recognition (OCR), and matching against inventory based on visual cues from an image or video. According to various embodiments, functionality of the computer vision component 208 can also include aspect localization and recognition as described herein. A bot enabled with computer vision is beneficial when running on a mobile device which has a built-in camera. Neural networks (e.g., deep neural networks) can enable operation of the computer vision component 208.

With reference to the speech recognition component 210, a feature extraction component operates to convert a raw audio waveform to a some-dimensional vector of numbers that represents the sound. This component uses deep learning to project the raw signal into a high-dimensional semantic space. An acoustic model component operates to host a statistical model of speech units, such as phonemes and allophones. These statistical model of speech units can include Gaussian Mixture Models (GMM), although the use of Deep Neural Networks is possible. A language model component uses statistical models of grammar to define how words are put together in a sentence. Such models can include n-gram-based models or Deep Neural Networks built on top of word embeddings. A speech-to-text (STT) decoder component converts a speech utterance into a sequence of words, typically leveraging features derived from a raw signal using the feature extraction component, the acoustic model component, and the language model component in a Hidden Markov Model (HMM) framework to derive word sequences from feature sequences. In one example, a speech-to-text service in the cloud has these components deployed in a cloud framework with an API that allows audio samples to be posted for speech utterances and the corresponding word sequences to be retrieved. Control parameters are available to customize or influence the speech-to-text process.

Machine-learning algorithms may be used for matching, relevance, and final re-ranking by the AIF 144 services. Machine learning is a field of study that gives computers the ability to learn without being explicitly programmed. Machine learning explores the study and construction of algorithms that can learn from and make predictions on data. Such machine-learning algorithms operate by building a model from example inputs in order to make data-driven predictions or decisions expressed as outputs. Machine-learning algorithms may also be used to teach how to implement a process.

Deep learning models, deep neural networks (DNNs), recurrent neural networks (RNNs), convolutional neural networks (CNNs), and long short-term CNNs, as well as other machine-learning models and IR models, may be used. For example, the search component 218 may use n-gram, entity, and semantic vector-based queries to match products. Deep-learned semantic vectors give the ability to match products to non-text inputs directly. Multi-leveled relevance filtration may use BM25, predicted query leaf category+ product leaf category, semantic vector similarity between query and product, and other models to pick the top candidate products for the final re-ranking algorithm.

Predicted click-through rate and conversion rate, as well as gross merchandise volume (GMV), constitute the final re-ranking formula to tweak functionality towards specific business goals, more shopping engagement, more products purchased, or more GMV. Both the click-through-rate prediction and conversion prediction models take query, user, seller, and product as input signals. User profiles are enriched by learning from onboarding, sideboarding, and user behaviors to enhance the precision of the models used by each of the matching, relevance, and ranking stages for individual users. To increase the velocity of model improvement, an offline evaluation pipeline is used before online A/B testing.

In one example of an AIF 144, two additional parts for the speech recognition component 210 are provided, a speaker adaptation component and a language model (LM) adaptation component. The speaker adaptation component allows clients of an STT system (e.g., speech recognition component 210) to customize the feature extraction component and the acoustic model component for each speaker. This can be important because most speech-to-text systems are trained on data from a representative set of speakers from a target region, and typically the accuracy of the system depends heavily on how well the target speaker matches the speakers in the training pool. The speaker adaptation component allows the speech recognition component 210 (and consequently the AIF 144) to be robust to speaker variations by continuously learning the idiosyncrasies of a user's intonation, pronunciation, accent, and other speech factors and applying these to the speech-dependent components, e.g., the feature extraction component and the acoustic model component. While this approach utilizes a non-significant-sized voice profile that is created and persisted for each speaker, the potential benefits of accuracy generally far outweigh the storage drawbacks.

The LM adaptation component operates to customize the language model component and the speech-to-text vocabulary with new words and representative sentences from a target domain, for example, inventory categories or user personas. This capability allows the AIF 144 to be scalable as new categories and personas are supported.

The AIF's 144 goal is to provide a scalable and expandable framework for AI, one in which new activities, also referred to herein as missions, can be accomplished dynamically using the services that perform specific natural-language processing functions. Adding a new service does not require the complete system to be redesigned. Instead, the services are prepared (e.g., using machine-learning algorithms) if necessary, and the orchestrator 220 is configured with a new sequence related to the new activity. More details regarding the configuration of sequences are provided below with reference to other figures and associated text.

Various embodiments presented herein provide for dynamic configuration of the orchestrator 220 to learn new intents and how to respond to the new intents. In some embodiments, the orchestrator 220 "learns" new skills by receiving a specification for a new sequence associated with the new activity. The sequence specification includes a sequence of interactions between the orchestrator 220 and a set of one or more service servers from the AIF 144. In some embodiments, each interaction of the sequence includes (at least): identification of a service server, a call parameter definition to be passed with a call to the identified service server, and a response parameter definition to be returned by the identified service server.

In some embodiments, the services within the AIF 144, except for the orchestrator 220, are not aware of each other, e.g., they do not interact directly with each other. The orchestrator 220 manages all the interactions with the other services. The central coordinating resource simplifies the implementation of the other services, which need not be aware of the interfaces (e.g., APIs) provided by the other services. Of course, there can be some cases where a direct interface may be supported between pairs of services.

Figure 6:
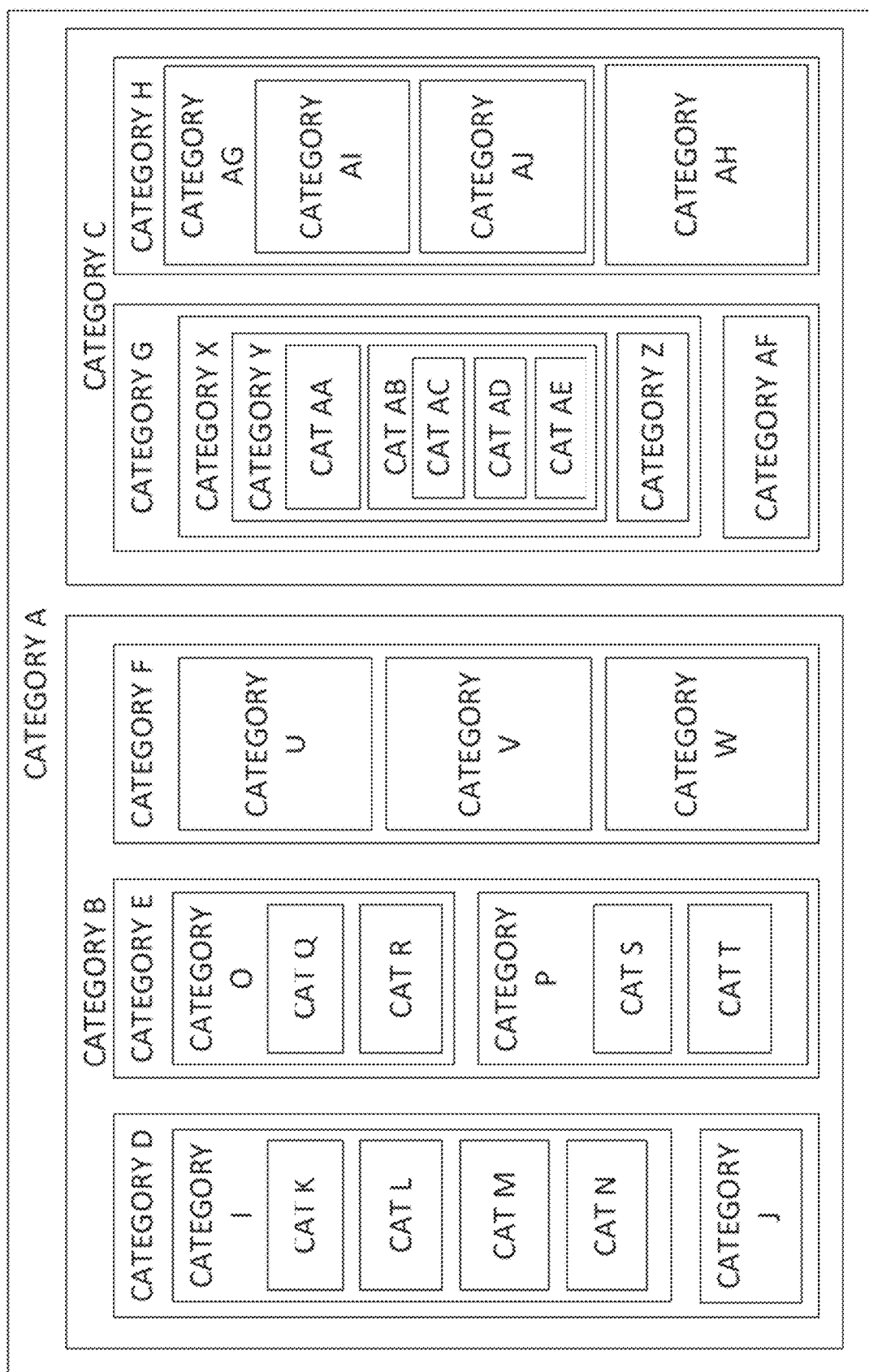
FIG. 6 is a diagram of a category hierarchy tree that arranges each publication of a publication corpus into a hierarchy, in accordance with some embodiments.

FIG. 6 is a diagram of a category hierarchy tree that arranges each publication of a publication corpus into a hierarchy, in accordance with some embodiments. In some embodiments, the publication categories are then organized into a hierarchy (e.g., a map or tree), such that more general categories include more specific categories. Each node in the tree or map is a publication category that has a parent category (e.g., a more general category with which the publication category is associated) and potentially one or more child categories (e.g., narrower or more specific categories associated with the publication category), which may be regarded as leaf categories. Each publication category is associated with a particular static webpage.

In accordance with some embodiments, a plurality of publications are grouped together into publication categories. In this example, each category is labeled with a letter (e.g., category A-category AJ). In addition, every publication category is organized as part of a hierarchy of categories.

In this example, category A is a general product category that all other publication categories descend from. Publications in category A are then divided into at least two different publication categories, category B and category C. It should be noted that each parent category (e.g., in this case, category A is a parent category to both category B and category C) may include a large number of child categories (e.g., subcategories).

In this example, publication categories B and C both have subcategories (or child categories). For example, if category A is clothing publications, category B can be men's clothing publications and category C can be women's clothing publications. Subcategories for category B include category D, category E, and category F. Each of subcategories D, E, and F may have a different number of subcategories, depending on the specific details of the publications covered by each subcategory.

For example, if category D is active-wear publications, category E is formal-wear publications, and category F is outdoor-wear publications, each subcategory includes different numbers and types of subcategories. For example, category D (active-wear publications in this example) includes subcategories I and J. Subcategory I includes active-footwear publications (for this example) and subcategory J includes t-shirt publications. As a result of the differences between these two subcategories, subcategory I includes four additional subcategories (subcategories K-N) to represent different types of active-footwear publications (e.g., running-shoe publications, basketball-shoe publications, climbing-shoe publications, and tennis-shoe publications). In contrast, subcategory J (which, in this example, is for t-shirt publications) does not include any subcategories (although in a real product database, a t-shirt publications category would likely include subcategories).

Thus, each category has a parent category (except for the uppermost product category) which represents a more general category of publications and potentially one or more child categories or subcategories (which are more specific publications categories within the more general category). Thus, category E has two subcategories, O and P, and each subcategory has two child product categories, categories Q and R and categories S and T, respectively. Similarly, category F has three subcategories (U, V, and W).

Category C, a product category that has category A as its parent, includes two additional subcategories (G and H). Category G includes two children (X and AF). Category X includes subcategories Y and Z, category Y includes subcategories AA and AB, and category AB includes AC-AE. Category H includes subcategories AG and AH. Category AG includes subcategories AI and AJ.

As noted herein, where the publication corpus relates to an electronic marketplace, the categories describe predetermined product groupings or sub-groupings provided by the electronic marketplace (e.g., "wine", "shoes", "paint"), or may be open-ended for seller definition. Categories may be branched, so that a particularly narrow subcategory may be regarded as a leaf category (e.g., "men's athletic shoes") that may best narrow a given search to a small set of items best meeting a specified set of search constraints.

As noted herein, aspects are characteristics of publications listed in a given category. Aspects may comprise descriptive parameters that may be specified by particular aspect values, to provide further precise search keys for finding a particular product. As noted herein, example aspects or attributes may include, but are not limited to, "brand", "color", "style", "material", and "size". Corresponding exemplary values may include "Nike", "red", "running", "canvas", and "ten", for example. Aspects of different categories may or may not overlap, or be unique to a specific category. For some embodiments, where the publication corpus relates to an electronic marketplace, a knowledge graph retains categories, aspects, and aspect values provided by sellers to help buyers find a product in an electronic marketplace inventory. Similarly, the knowledge graph may include popular categories, aspects, and aspect values that buyers have frequently used when searching for particular items. Knowledge graph construction and use is described further in the related applications previously incorporated by reference.

Figure 7:
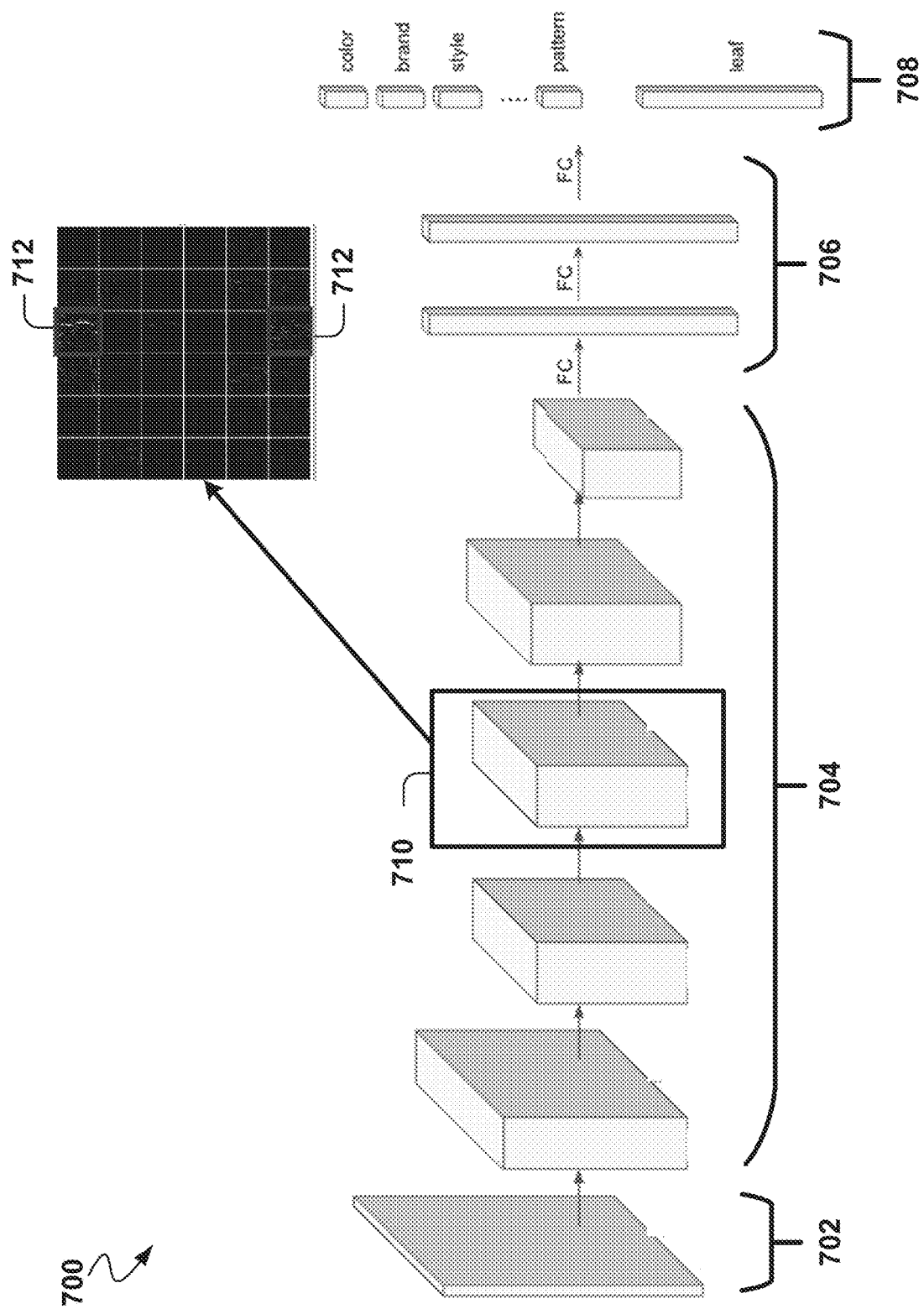
FIG. 7 is a diagram illustrating an example architecture of a neural network for predicting aspect values and aspect locations for an input image, according to some embodiments.

FIG. 7 is a diagram illustrating an example architecture of a neural network 700 for predicting aspect values and aspect locations for an input image, according to some embodiments. For some embodiments, the neural network 700 represents a deep-learning neural network. The neural network 700 receives an input image 702 depicting an object and, with respect to the depicted object, provides data that describes a predicted leaf category and predicted aspect values for a set of aspects of the depicted object. The neural network 700 comprises a set of convolution layers 704, a set of fully connected layers 706, and a final layer 708 including a set of parallel layers. According to some embodiments, the neural network 700 provides the prediction data in parallel through the final layer 708. In FIG. 7, the final layer 708 comprises a leaf layer to predict a leaf category for the object depicted in the input image 702, and a set of separate aspect layers for predicting different aspect values of the depicted object (e.g., one for color, one for brand, one for style, one for pattern, etc.).

As a byproduct of predicting aspect values, one or more middle layers in the set of convolution layers 704 can be utilized to locate where in the input image 702 aspect values are found by the neural network 700. In particular, activation of a convolution layer in the set of convolution layers 704 (e.g., a middle convolution layer 710) can be used to identify regions of the input image 702 that are salient to a particular aspect value that is predicted for the input image 702 by the final layer 708. For instance, where the middle convolution layer 710 is known to predict a certain visual aspect (e.g., color or logo), locations 712 of neurons of the middle convolution layer 710 that are activated by the input image 702 may correspond to locations on the input image 702 that relate to (e.g., that are relevant to predicting an aspect value of) the certain visual aspect. Additionally, the level of activation of a neuron can determine the level of relevance/influence that a location on the input image 702, corresponding to the activated neuron, has on an aspect value predicted for the certain visual aspect.

Figure 8:
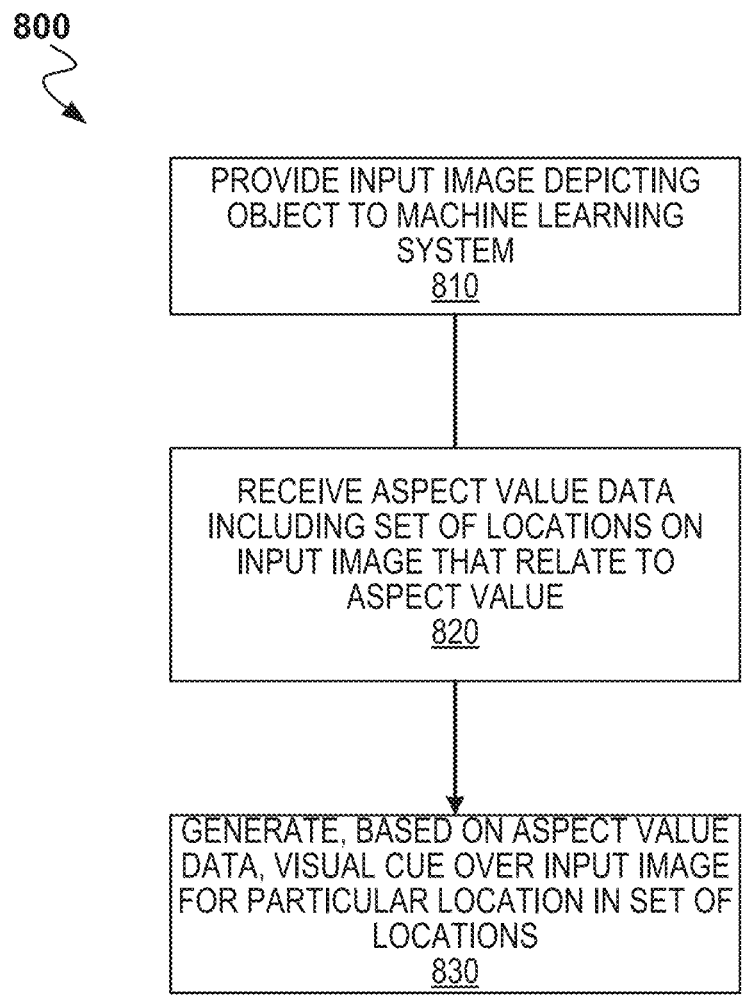
FIGS. 8-10 are diagrams illustrating example process flows of presenting aspect localization on an input image, according to some embodiments.

FIG. 8 illustrates an example process flow 800 of presenting aspect localization on an input image, according to some embodiments. The example process flow 800 may be performed as part of, or in conjunction with, the intelligent personal assistant system 142, which may be associated with a publication corpus. Beginning at operation 810, an input image, depicting an object, is provided to a machine-learning system. For some embodiments, the machine-learning system comprises the neural network 700 of FIG. 7, and providing the input image to the machine-learning system comprises processing the input image through the neural network 700. The machine-learning system may be associated with the publication corpus. The input image may comprise a photograph, a video frame, a sketch, or a diagram, for example. The input image is typically a digital image file, such as one that is produced by a portable camera or smartphone, or such as one that is copied from a website or an electronic message.

Additionally, the input image may be provided to the machine-learning system as part of a visual search performed on the input image, as described below. A neural network included by the visual search service, such as the neural network 700 of FIG. 7, may process the input query image. The neural network may comprise a fully convolutional neural network (FCN). In another embodiment, the neural network may comprise a hybrid neural network (termed a CRF-RNN) including a fully convolutional neural network and a recurrent neural network (RNN) that includes conditional random fields (CRF).

Images processed by the neural network may comprise an input image from the image query as well as any number of images associated with any number of candidate products in an electronic marketplace, for example. The neural network in the visual search service may produce an image signature that concisely describes image content. In general, an image signature may numerically describe a number of image features and their relative dominance of overall image content. Each image signature may comprise a vector of binary numbers, for example, also referred to as a binary hash. Any form of image signature may be considered to be within the scope of this description.

The visual search service may generate metadata and image signatures from input images. The visual search service may also receive metadata and image signatures from product images. Metadata may comprise, for example, a product identification (ID) number and a universal resource locator (URL) for a product listing in the electronic marketplace. The visual search service may then calculate a visual similarity measure between images, such as between a particular candidate product image and the input query image. The visual similarity measure may be estimated by calculating a distance value between two image signatures. The distance value may comprise a Hamming distance, by way of example but not limitation. A Hamming distance generally describes the number of bits that are different in two binary vectors. Similar images being compared may therefore have a smaller Hamming distance between them, and thus a higher visual similarity measure, than less similar images. The visual similarity measure is therefore useful as a search result score, e.g., for the candidate product at hand.

In one embodiment, each product image previously provided by sellers in an electronic marketplace may be processed to generate an image signature that may be stored in an index. The processing may be performed offline to build a catalog of image signatures without interfering with ongoing "live" operations of the electronic marketplace.

Any approach for calculating the visual similarity measure may provide the search result score described. Visual search result scores for any number of candidate products may, for example, be generated via visual comparisons with an input query image as described above. The visual search result scores may determine the order in which ranked candidate products may be presented to a user in response to the image query. The end result of the visual search may comprise an output item list, which may correspond to available products in the electronic marketplace, for example. The results of a visual search may be factored into an overall composite search scheme in any number of different formulations. In one example, a weighting coefficient may weight the visual search result score by a user-adjustable weighting factor, and the remaining weight may be applied to scores from a leaf category prediction from the knowledge graph.

At operation 820, aspect value data is received from the machine-learning system. The aspect value data may be generated by the machine-learning system in response to the input image provided to the machine-learning system. For some embodiments, the aspect value data includes a set of locations on the input image that relate to an aspect value (e.g., blue, short-sleeve, plaid, large, etc.) for an aspect (e.g., color, style, pattern, size, etc.) of the object depicted in the input image. According to some embodiments, the set of locations included by the aspect value data is determined based on activation of a mid-level convolution layer of the trained neural network. In particular, the set of locations may correspond with locations of neurons of the mid-level convolution layer activated when the input image is processed by the neural network of the machine-learning system.

The aspect value characterizes the object depicted in the input image. The aspect value data may include additional information such as a probability (also referred to as an aspect probability) that the object depicted possesses the aspect value (e.g., 70% probability value that the object depicted in the input image has a color aspect having an aspect value of blue). The object depicted in the input image may be associated with a particular leaf category, and the aspect value may be associated with an aspect exclusive to the particular leaf category associated with the object. The leaf category of the object may be one of a plurality of categories used by a publication corpus as a taxonomy of publications in the publication corpus and as a taxonomy of the publication images of the publications in the publication corpus. For some embodiments, the machine-learning system may determine the aspect value of the object based on the leaf category associated with the object.

At operation 830, for a particular location in the set of locations, a visual cue is generated over the input image based on the aspect value data received at operation 820. Generating the visual cue over the input image can cause the visual cue to be displayed over the input image (e.g., on a mobile device). Examples of visual cues can include, without limitation, a heat map-based visual cue (e.g., heat intensity represents the relevance of a location to the aspect value), a callout, a point, a bounding shape (e.g., square or circle), or a shading (e.g., highlighted region of the input image). For various embodiments, the visual cue is presented over the input image as a visual overlay, which the user may interact with through a graphic user interface (e.g., touch-screen interaction). The visual cue may be generated directly over the particular location of the aspect value (e.g., as a point), or relative to the particular location (e.g., as a callout box). The visual cue may be shown or hidden based on proximity of user input to the particular location (e.g., touch-screen contact detected over the particular location). Additionally, the aspect value associated with the visual cue may be shown or hidden based on user interaction with the visual cue. When presented, the visual cue may include an aspect probability associated with the aspect value.

Figure 9:
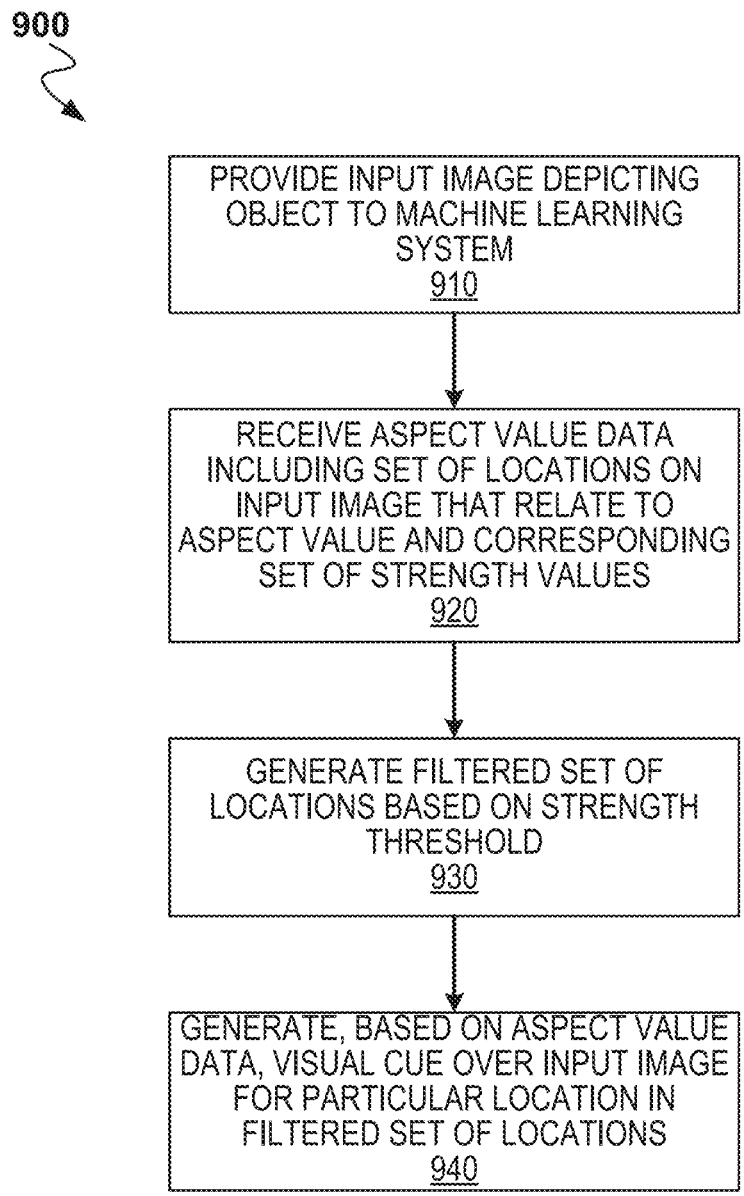

FIG. 9 illustrates an example process flow 900 of presenting aspect localization on an input image, according to some embodiments. The example process flow 900 may be performed as part of, or in conjunction with, the intelligent personal assistant system 142, which may be associated with a publication corpus. The example process flow 900 begins at operation 910, which is similar to operation 810.

At operation 920, aspect value data is received from the machine-learning system. As noted herein, the aspect value data may be generated by the machine-learning system in response to the input image provided to the machine-learning system. According some embodiments, the aspect value data includes a set of locations on the input image that relate to an aspect value (e.g., blue, short-sleeve, plaid, large, etc.) for an aspect (e.g., color, style, pattern, size, etc.) of the object depicted in the input image, and further includes a set of strength values corresponding to the set of locations. A particular strength value in the set of strength values can represent a relevance level of the particular location to the aspect value (e.g., determining or causing the prediction of the aspect value). For some embodiments, the strength value is a numerical value, which may fall within a scale of relevance (e.g., 0 to 10). For various embodiments, the particular strength value of the particular location is reflected by a visual cue eventually generated for the particular location. For instance, the color, shape, shading, or associated label of the visual cue may be adjusted based on the particular visual strength value.

At operation 930, a filtered set of locations is generated by filtering the set of locations (included in the aspect value data received at operation 920) based on a strength threshold and the set of strength values (included in the aspect value data received at operation 920). Alternatively, or additionally, the set of locations may be ranked based on the strength threshold and the set of strength values. The strength threshold may define a minimum strength value (e.g., relevance to/influence on the aspect value) of a location for which a visual cue is generated at operation 940. The minimum strength value may comprise a numerical value that falls within a scale of relevance noted herein.

At operation 940, for a particular location in the filtered set of locations, a visual cue is generated over the input image based on the aspect value data received at operation 920.

Figure 10:
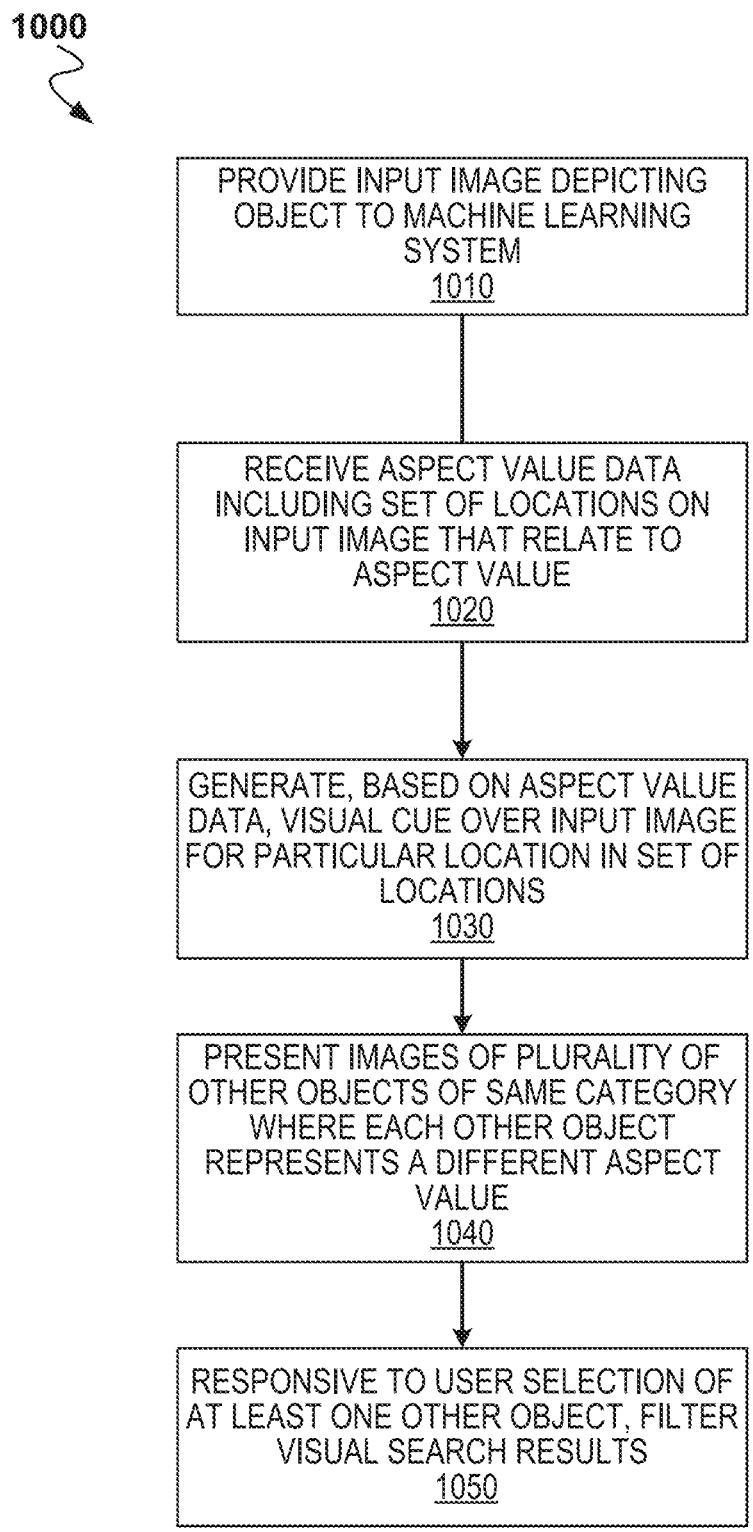

FIG. 10 illustrates an example process flow 1000 of presenting aspect localization on an input image, according to some embodiments. The example process flow 1000 may be performed as part of, or in conjunction with, the intelligent personal assistant system 142, which may be associated with a publication corpus. The example process flow 1000 begins with operations 1010, 1020, and 1030, which are similar to operations 810, 820, and 830 of FIG. 8 respectively.

At operation 1040, images of a plurality of other objects, sharing a category (e.g., a leaf category, such as "men's shoes") with the object (e.g., shoe) depicted in the input image, are presented, where each other object represents a different aspect value (e.g., athletic shoe, dress shoe, running shoe, hiking shoe). For some embodiments, the plurality of other objects is presented in response to a user selecting, or otherwise interacting with, the visual cue generated at operation 1030 over the input image in connection with the aspect value. The other objects may comprise example objects that each possess one of the different aspect values. Each of the other objects shares a category with the depicted object (e.g., all are men's shoes) and shares a particular aspect with the depicted object (e.g., all possess a style aspect), but each may possess a different aspect value than the one possessed by the depicted object (e.g., depicted object is a basketball shoe while all the others presented are not).

By presenting the plurality of other objects that share a category and that share a particular aspect with the depicted object, the system enables a user to interact with the plurality of other objects to refine a visual search performed based on the input image. For instance, a user may select one of the plurality of other objects, which may cause results of a visual search performed on the input image (e.g., of a men's athletic shoe) to be filtered according to the aspect value (e.g., aspect value of dress shoe) possessed by the selected other object. The results from the visual search performed on the input image can include objects that best match the input image but that may also possess a different aspect value than the depicted object. Refining the visual search results as described herein can permit a user to visually interact with the system and specify a desired aspect value using visual content (e.g., images of the other objects).

At operation 1050, in response to a user selection of at least one of the other objects presented at operation 1040, results of a visual search performed on the input image are filtered based on the different aspect value represented by the selected at least one other object.

Figure 11:
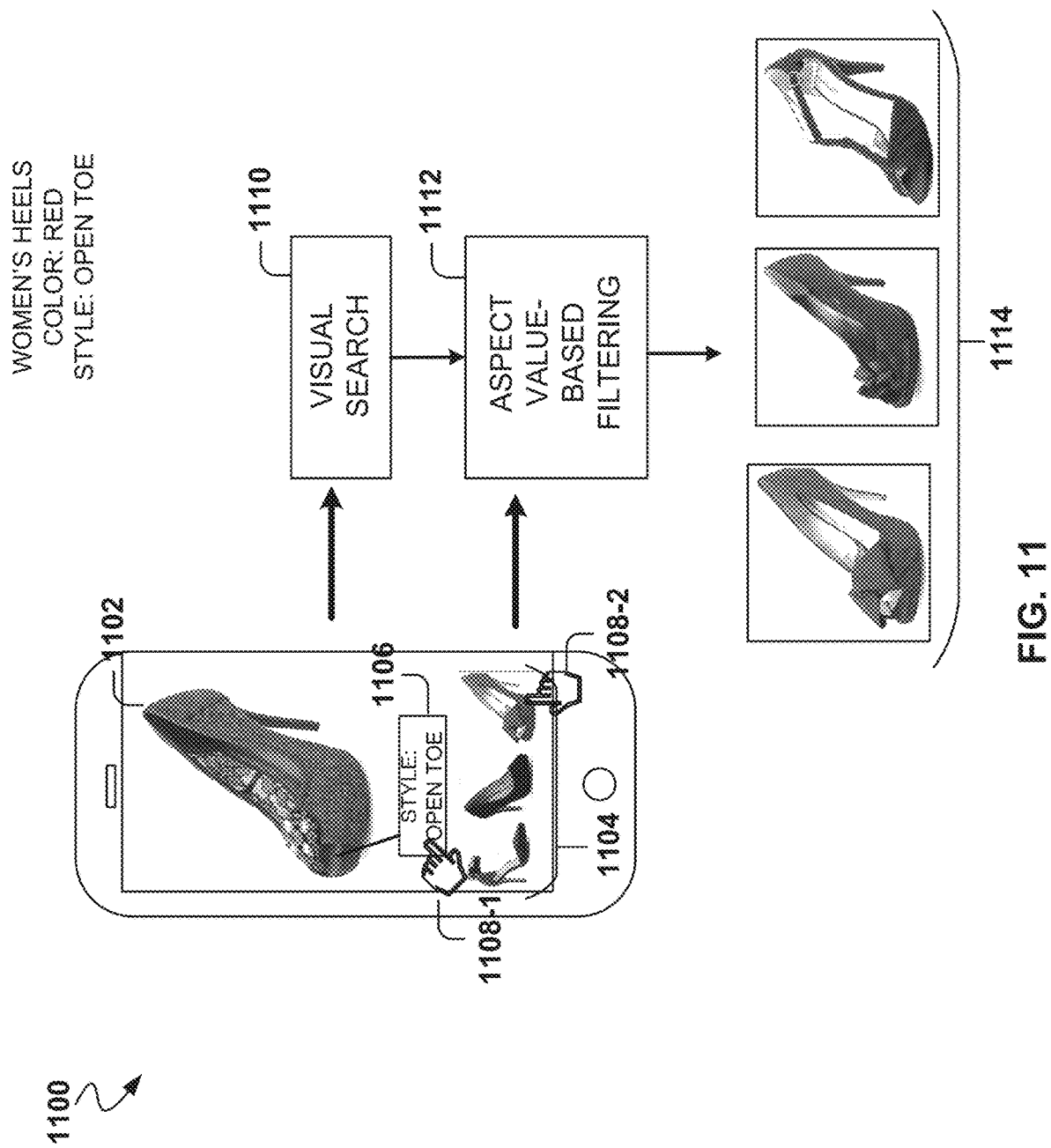
FIG. 11 is a diagram illustrating an example visual search refined by user interaction with a visual cue corresponding to an aspect value of an object depicted in an input image, according to some embodiments.

FIG. 11 is a diagram illustrating an example visual search 1100 refined by user interaction with a visual cue corresponding to an aspect value of an object depicted in an input image, according to some embodiments. As shown, a mobile device is displaying an input image 1102 of a women's high-heel shoe, which the mobile device may have captured (e.g., using a built-in camera) or saved from the Internet (e.g., from a website). The input image 1102 is submitted to a visual search 1110, which can provide a set of objects (e.g., list of candidate products) from a publication corpus (e.g., an ecommerce inventory) that closest match the input image 1102. For some embodiments, the visual search 1110 includes a neural network that facilitates the image search of the publication corpus, and provides a set of aspect values possessed by the object depicted in the input image 1102 (e.g., women's high heel, color red, open-toe style) and a set of locations for the set of aspect values. As shown, a visual cue 1106 is generated for a location on the shoe that relates to the open-toe aspect value for the style aspect. A user interaction 1108-1 (e.g., touch-screen contact) with the visual cue 1106 causes the presentation of a set of images 1104 of other objects that share a category (e.g., women's high-heel shoe) with the object depicted in the input image 1102, representing different aspect values for the style aspect (e.g., pointed toe, rounded toe, and open toe). A user interaction 1108-2 (e.g., touch-screen contact) with one of the images 1104 (e.g., open toe) causes the aspect value represented by the selected image to be used in aspect value-based filtering 1112 of the visual search-based search results provided by the visual search 1110. Filtered results 1114 produced can be presented for a user's browsing and possible purchase (e.g., through an ecommerce system).

Figure 12:
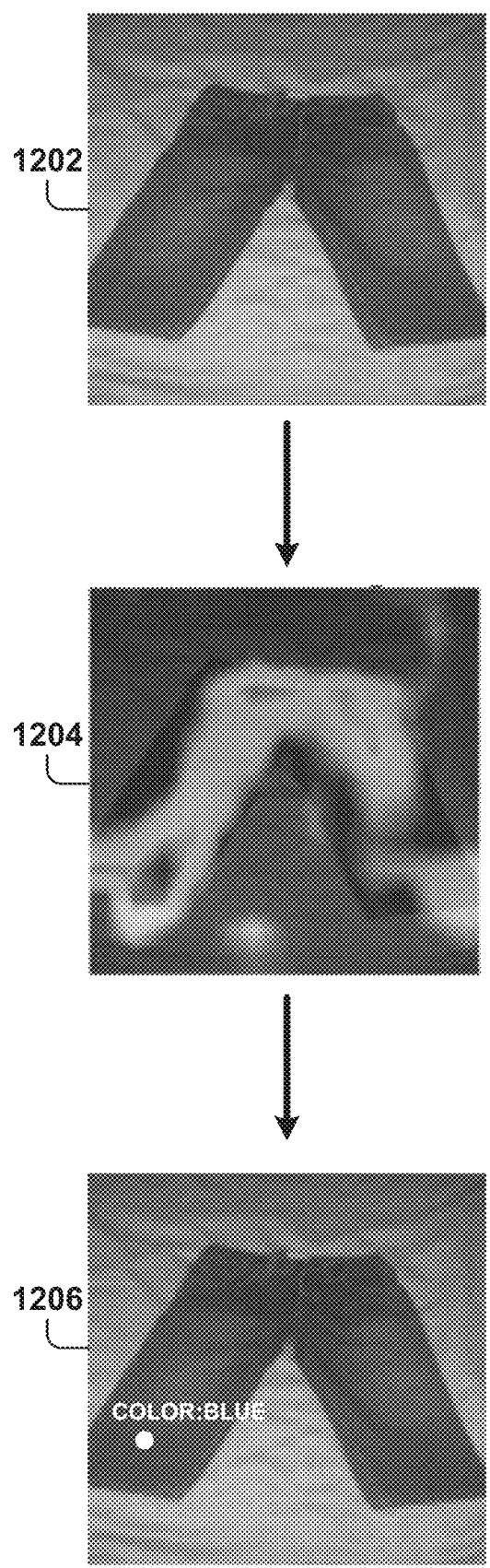
FIG. 12 is a diagram illustrating how a visual cue is generated based on a strength value of a location in the input image that has an aspect value, according to some embodiments.

FIG. 12 is a diagram illustrating how a visual cue is generated based on a strength value of a location in the input image that has an aspect value, according to some embodiments. In particular, an input image 1202 depicts a pair of blue jeans. In accordance with an embodiment, a machine system can process the input image 1202 and determine a set of locations corresponding, for example, to a color aspect. An image 1204 illustrates a heat map over the input image that depicts more "heat" for locations of the jeans that are most relevant to the color aspect. The machine system may provide the aspect value of blue for the color aspect possessed by the jeans depicted in the input image 1202. As shown by an image 1206, a visual cue is generated over the input image 1202 for the color aspect; the aspect value of blue is presented in association with the generated visual cue. For some embodiments, a location of the visual cue is determined based on the level of relevance the location has with respect to the aspect value of blue.

Figure 13:
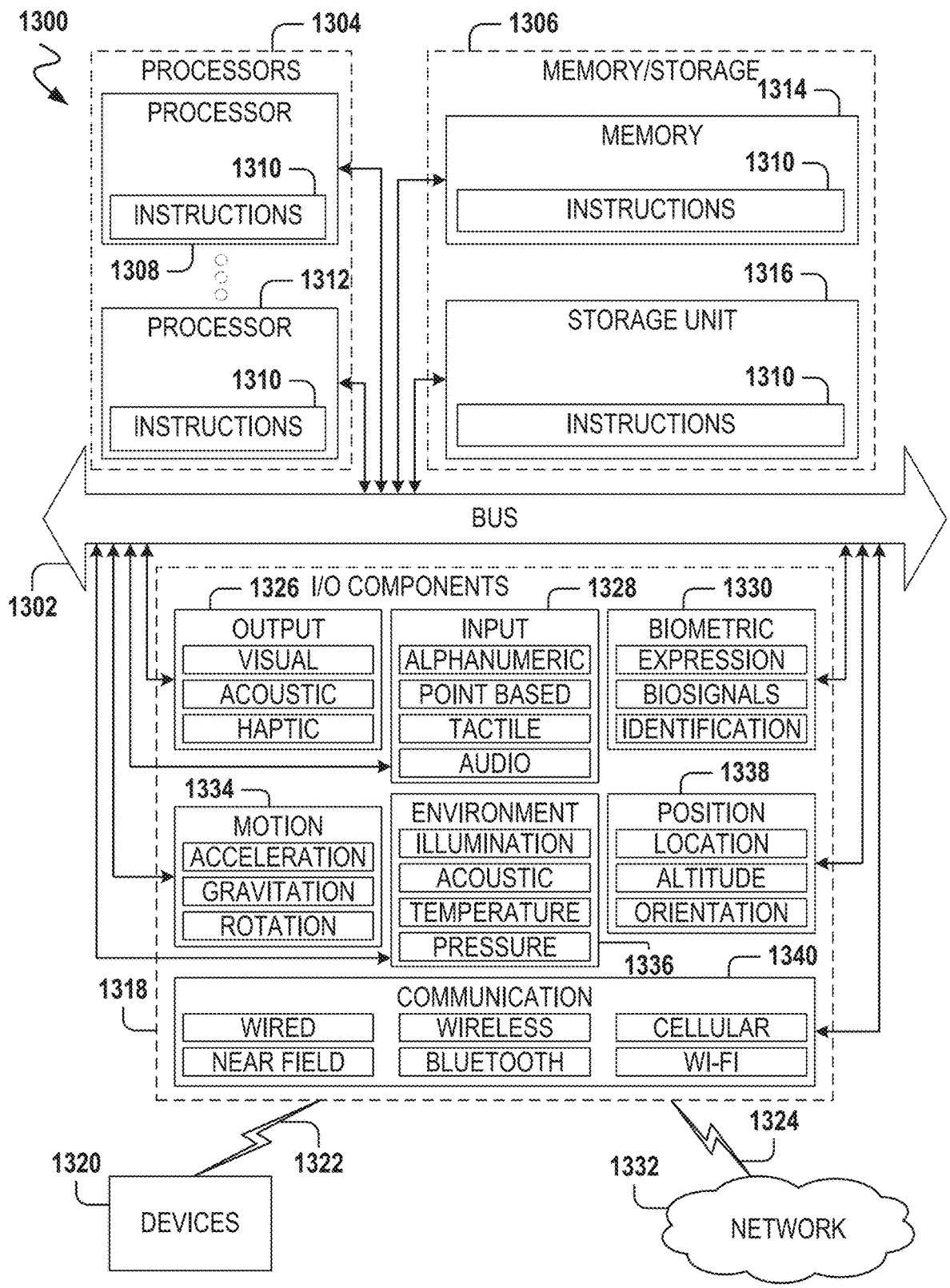
FIG. 13 is a block diagram illustrating components of an example machine, according to some embodiments.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute the flow diagrams of other figures. Additionally, or alternatively, the instructions 1310 may implement the servers associated with the services and components of other figures, and so forth. The instructions 1310 transform the general, non-programmed machine 1300 into a particular machine 1300 programmed to carry out the described and illustrated functions in the manner described.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines 1300 that individually or jointly execute the instructions 1310 to perform any one or more of the methodologies discussed herein.

The machine 1300 may include processors 1304, memory/storage 1306, and/O components 1318, which may be configured to communicate with each other such as via a bus 1302. In an embodiment, the processors 1304 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 1308 and a processor 1312 that may execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiples cores, or any combination thereof.

The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of the processors 1304 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1310. The term "machine-readable medium" shall also be taken to include any medium, or combination of multiple media, that is capable of storing instructions (e.g., instructions 1310) for execution by a machine (e.g., machine 1300), such that the instructions, when executed by one or more processors of the machine (e.g., processors 1304), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1318 may include a wide variety of components to receive input, provide output, produce output, transmit information, exchange information, capture measurements, and so on. The specific I/O components 1318 that are included in a particular machine will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion, and the grouping is in no way limiting. In various embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322, respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geo-location, location via Wi-Fi® signal triangulation, location via detecting an NFC beacon signal that may indicate a particular location, and so forth.

In various embodiments, one or more portions of the network 1332 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1332 or a portion of the network 1332 may include a wireless or cellular network and the coupling 1324 may be a Code Division Multiple Access (CDMA) connection, a Global System for Mobile communications (GSM) connection, or another type of cellular or wireless coupling. In this example, the coupling 1324 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1310 may be transmitted or received over the network 1332 using a transmission medium via a network interface device (e.g., a network interface component included in the communication components 1340) and utilizing any one of a number of well-known transfer protocols (e.g., hypertext transfer protocol (HTTP)). Similarly, the instructions 1310 may be transmitted or received using a transmission medium via the coupling 1322 (e.g., a peer-to-peer coupling) to the devices 1320. The term "transmission medium" shall be taken to include any intangible medium that is capable of storing, encoding, or carrying the instructions 1310 for execution by the machine 1300, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one", "one or more", or the like. The presence of broadening words and phrases such as "one or more", "at least", "but not limited to", or other like phrases in some instances shall not be read to mean that the narrower case is intended or required in instances where such broadening phrases may be absent. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
providing, by a hardware processor, an input image as an input to a machine-learning system comprising a trained neural network;
receiving, from the machine-learning system, a first category prediction of an object detected in the input image;
receiving, from the machine-learning system, aspect value data indicating a plurality of predicted aspect values for a corresponding plurality of aspects of the object, each of the plurality of aspects specific to the predicted first category of the object and each of the plurality of predicted aspect values further characterizing the object of the predicted first category, the aspect value data further including, for each of the plurality of aspects, a set of locations on the input image that are associated with a corresponding one of the plurality of predicted aspect values; and
generating, by the hardware processor and based on the aspect value data, a visual cue over the input image for a particular location in the set of locations, the visual cue selectable by user interaction on a display.

2. The method of claim 1, wherein the aspect value data includes a set of strength values corresponding to the set of locations, a particular strength value in the set of strength values representing a relevance level of the particular location to the aspect value.

3. The method of claim 2, wherein the visual cue indicates the particular strength value.

4. The method of claim 2, comprising generating, by the hardware processor, a filtered set of locations by filtering the set of locations based on a strength threshold and the set of strength values, the filtered set of locations including the particular location, and wherein the machine-learning system comprises a trained neural network, and the set of locations included by the aspect value data is determined based on information from of a convolution layer of the trained neural network.

5. The method of claim 1, wherein the aspect value data includes a probability value that the object depicted in the input image has the aspect value, and the visual cue indicates the probability value.

6. The method of claim 1, wherein the visual cue comprises at least one of a heat map-based visual cue, a call out, a point, a bounding shape, or a shading.

7. The method of claim 1, comprising responsive to receiving a user interaction with respect to the visual cue, causing presentation of a set of images that corresponds to a set of other objects, each particular object in the set of other objects representing a different aspect value of the particular aspect.

8. The method of claim 7, comprising responsive to a user selection of a particular image in the set of images that corresponds to a specific other object in the set of other objects, filtering, by the hardware processor, results of a visual search performed based on the input image, the specific other object representing a specific aspect value of the particular aspect, and the filtering being based on the specific aspect value.

9. The method of claim 1, further comprising:
receiving, from the machine-learning system, a second category prediction of a second object detected in a second image, the second category prediction different than the first category prediction;
receiving, from the machine-learning system, second aspect value data indicating a second plurality of aspect values for a corresponding second plurality of aspects of the second object, the second plurality of aspects specific to the predicted second category and configured to further characterize objects of the predicted second category, the second plurality of aspects different than the plurality of aspects characterizing the object detected in the input image, the aspect value data further including a second set of locations on the second image that relate to an aspect value; and generating, by the hardware processor and based on the aspect value data, a second visual cue over the second image for a second particular location in the second set of locations.

10. A computer comprising:

a storage device storing instructions; and a hardware processor configured by the instructions to perform operations comprising:

providing an input image as an input to a machine-learning system comprising a trained neural network;

receiving, from the machine-learning system, a category prediction of an object detected in the input image;

receiving, from the machine-learning system, aspect value data indicating a plurality of predicted aspect values for a corresponding plurality of aspects of the object, each of the plurality of aspects specific to the predicted first category of the object and each of the plurality of aspect values further characterizing object of the predicted first category, the aspect value data further including, for each of the plurality of aspects, a set of locations on the input image that are associated with a corresponding one of the plurality of predicted aspect values; and generating, based on the aspect value data, a visual cue over the input image for a particular location in the set of locations, the visual cue selectable by user interaction on a display.

11. The computer of claim 10, wherein the aspect value data includes a set of strength values corresponding to the set of locations, a particular strength value in the set of strength values representing a relevance level of the particular location to the aspect value.

12. The computer of claim 11, wherein the visual cue indicates the particular strength value.

13. The computer of claim 11, the operations further comprising generating a filtered set of locations by filtering the set of locations based on a strength threshold and the set of strength values, the filtered set of locations including the particular location.

14. The computer of claim 10, wherein the aspect value data includes a probability value that the object depicted in the input image has the aspect value, and the visual cue indicates the probability value.

15. The computer of claim 10, wherein the visual cue comprises at least one of a heat map-based visual cue, a call out, a point, a bounding shape, or a shading.

16. The computer of claim 10, the operations further comprising responsive to receiving a first user interaction with respect to the visual cue, causing presentation of a set of images that corresponds to a set of other objects, each particular object in the set of other objects representing a different aspect value of the particular aspect.

17. The computer of claim 16, wherein the hardware processor is configured by the instructions to perform operations comprising responsive to a user selection of a particular image in the set of images that corresponds to a specific other object in the set of other objects, filtering results of a visual search performed based on the input image, the specific other object representing a specific aspect value of the particular aspect, and the filtering being based on the specific aspect value.

18. A method comprising:

providing, by a hardware processor, an input image as an input to a machine-learning system comprising a trained neural network;

receiving, from the machine-learning system, a category prediction of an object detected in the input image;

receiving, from the machine-learning system, aspect value data indicating a plurality of predicted aspect values for a corresponding plurality of aspects of the object, each of the plurality of aspects specific to the predicted category of the object and each of the plurality of predicted aspect values further characterizing the object of the predicted category, the aspect value data further including, for each of the plurality of aspects, a set of locations on the input image that are associated with a corresponding one of the plurality of predicted aspect values;

generating, by the hardware processor and based on the aspect value data, a visual cue over the input image for a particular location in the set of locations, the visual cue selectable by user interaction on a display; and responsive to receiving a user interaction with respect to the visual cue, causing, by the hardware processor, presentation of the aspect value associated with the visual cue.

19. The method of claim 18, wherein the visual cue includes an aspect probability associated with the aspect value.

* * * * *

UNITED STATES PATENT AND TRADEMARK OFFICE
CERTIFICATE OF CORRECTION

PATENT NO. : 10,943,176 B2
APPLICATION NO. : 15/465883
DATED : March 9, 2021
INVENTOR(S) : Licheng Yu et al.

Page 1 of 1

It is certified that error appears in the above-identified patent and that said Letters Patent is hereby corrected as shown below:

In the Claims

In Column 24, Line 33, in Claim 4, delete "of a" and insert -- a --, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*